(12) United States Patent  
Bauer

(10) Patent No.: US 6,672,689 B1
(45) Date of Patent: Jan. 6, 2004

(54) SYSTEM AND METHOD OF REGULATING MANUAL CONTROL OF A VEHICLE IN A SLIDING CONDITION

(75) Inventor: Geoffrey Burke Bauer, Auburn Hills, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 10/184,244

(22) Filed: Jun. 28, 2002

(51) Int. Cl.[7] .................................................. B60T 8/60
(52) U.S. Cl. ....................... 303/146; 303/20; 303/144; 303/154
(58) Field of Search .......................... 303/3, 7, 9.62, 303/125, 133, 139, 140, 144, 146, 147, 154, 166, 167, 20

(56) References Cited

U.S. PATENT DOCUMENTS

| | | | | |
|---|---|---|---|---|
| 5,428,532 A | * | 6/1995 | Yasuno | 701/48 |
| 5,576,959 A | * | 11/1996 | Hrovat et al. | 701/70 |
| 5,671,982 A | * | 9/1997 | Wanke | 303/146 |
| 5,694,319 A | * | 12/1997 | Suissa et al. | 701/41 |
| 5,710,705 A | * | 1/1998 | Eckert | 701/83 |
| 5,752,752 A | * | 5/1998 | Tozu et al. | 303/146 |
| 5,813,732 A | * | 9/1998 | Monzaki et al. | 303/146 |
| 5,927,830 A | * | 7/1999 | Tozu et al. | 303/155 |
| 6,015,193 A | * | 1/2000 | Vogel et al. | 303/147 |
| 6,089,680 A | * | 7/2000 | Yoshioka et al. | 303/146 |
| 6,129,424 A | * | 10/2000 | Kubonoya | 303/146 |
| 6,202,019 B1 | * | 3/2001 | Schmidt et al. | 701/72 |
| 6,219,610 B1 | * | 4/2001 | Araki | 701/72 |
| 6,352,318 B1 | * | 3/2002 | Hosomi et al. | 303/139 |
| 6,374,162 B1 | * | 4/2002 | Tanaka et al. | 701/1 |
| 6,415,215 B1 | * | 7/2002 | Nishizaki et al. | 701/70 |
| 6,435,626 B1 | * | 8/2002 | Kostadina | 303/139 |
| 6,442,469 B1 | * | 8/2002 | Matsuno | 701/70 |
| 6,456,920 B1 | * | 9/2002 | Nishio et al. | 701/70 |
| 6,564,140 B2 | * | 5/2003 | Ichikawa et al. | 701/91 |
| 2003/0107265 A1 | * | 6/2003 | Arnold | 303/139 |

* cited by examiner

Primary Examiner—Christopher P. Schwartz
Assistant Examiner—Devon Kramer
(74) Attorney, Agent, or Firm—Brinks Hofer Gilson & Lione

(57) ABSTRACT

The present invention involves a system and method of regulating manual control for a driver of a vehicle during a sliding condition of the vehicle having an electronic stability program using a stability control system. The method includes recognizing the vehicle in a sliding condition and determining whether the vehicle is manually controllable in the sliding condition. The method further includes adjusting the electronic stability program, if the vehicle is determined to be manually controllable, and activating the stability control system to control the vehicle when the vehicle is not manually controllable. The method further includes applying a compensated brake pressure on the vehicle based on the activation of the stability control system.

47 Claims, 3 Drawing Sheets

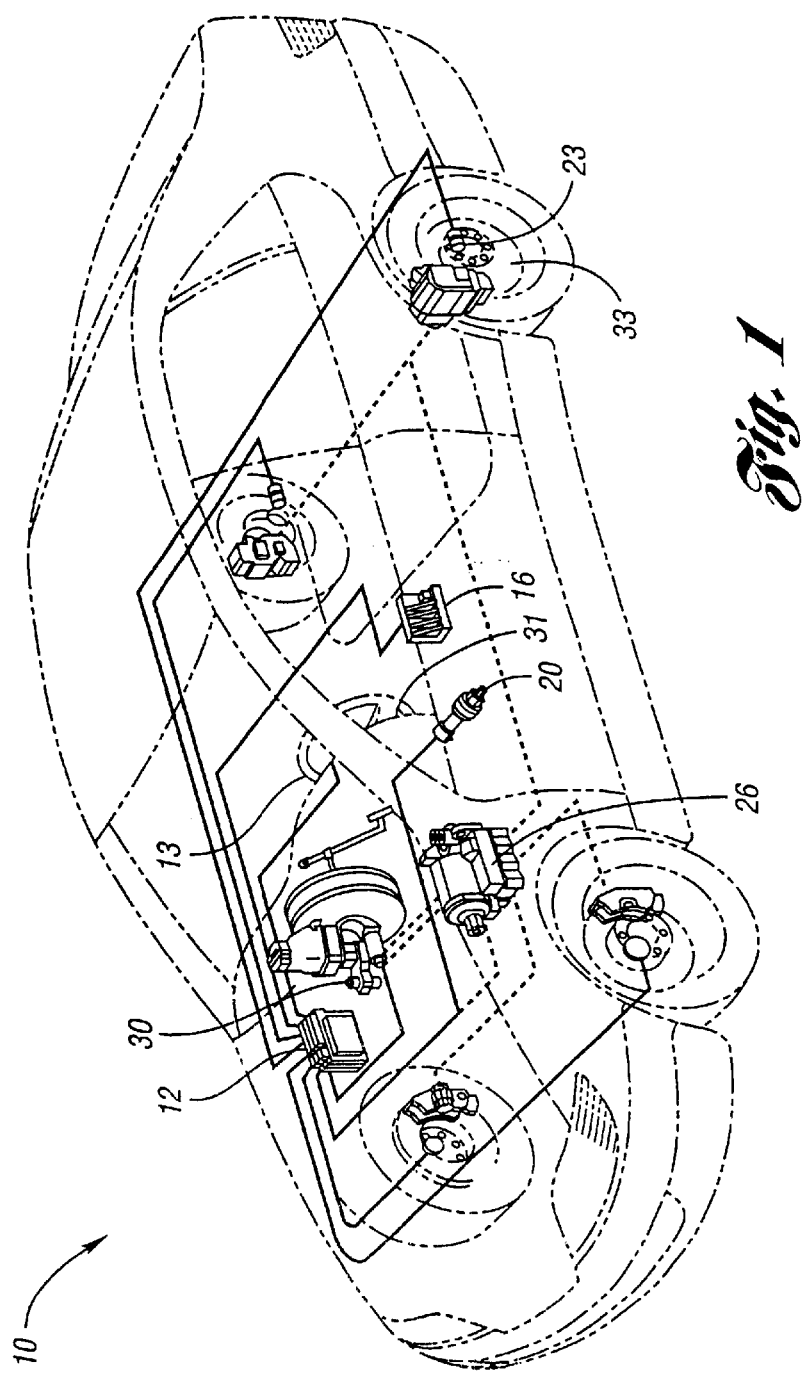

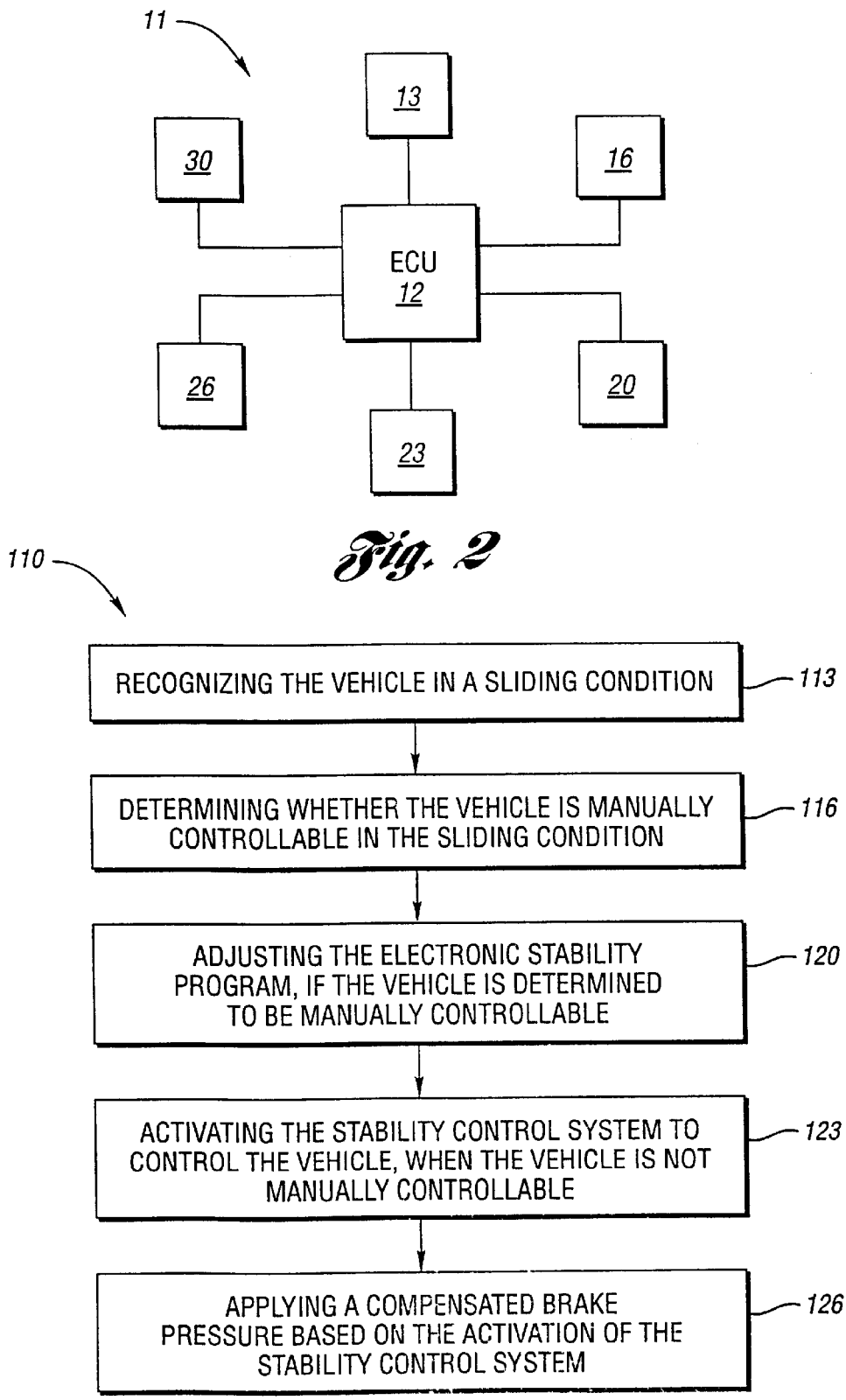

ABS(beta_dot) < MAX_BETA_DOT    /*Criteria 1 */
    and
ABS(yaw_error) < MAX_YAW_ERROR    /*Criteria 1a */
    and
SIGN(swa_dot) == SIGN(beta_dot)    /*Criteria 2 */
    and
ABS(swa_dot) > (beta_dot - BETA_DOT_ACTIVE_BAND)    /*Criteria 3 */
    and
ABS(swa_dot) < (beta_dot + BETA_DOT_ACTIVE_BAND)    /*Criteria 3a */
    and
ABS(swa) < MAX_SWA    /*Criteria 4 */
    and
ABS(swa) > MIN_SWA    /*Criteria 4a */

Fig. 4

SYSTEM AND METHOD OF REGULATING MANUAL CONTROL OF A VEHICLE IN A SLIDING CONDITION

BACKGROUND OF THE INVENTION

The present invention is related to a system and method of regulating manual control of a vehicle during a sliding condition of the vehicle having an electronic stability program.

Electronic stability programs (ESP) are known and are being widely used in the automotive industry. An electronic stability program operates to stabilize or correct a vehicle in an out-of-control or a sliding condition during operation of the vehicle. An electronic stability program may include a traction control system, an anti-lock brake system, an engine torque control system, and/or a stability control system. Typically, an electronic stability program operates during a sliding condition of the vehicle to correct a driver's oversteering or understeering of the vehicle. Once the ESP of the vehicle recognizes that the vehicle is in a sliding condition, the ESP applies a calculated amount of brake pressure on at least one wheel or wheel end of the vehicle, depending on the sliding conditions. The brake pressure serves to recover or correct the vehicle in an oversteering or an understeering thereof. This provides the vehicle with a better likelihood of correction from the sliding condition. As known, the brake pressure may be applied in a step or pulse manner based on the sliding condition.

Although current electronic stability programs for vehicles are adequate, improvements thereon may be made. For example, designers and manufacturers of electronic stability programs have been challenged in providing experienced drivers with an opportunity to manually compensate or control a vehicle in a sliding condition. Typically, a vehicle having an electronic stability program immediately activates a stability control system to correct a vehicle in a sliding condition without providing the driver thereof with an opportunity or time to manually correct the vehicle. In fact, a steering correction on a vehicle applied by an experienced driver during a sliding condition may cause one of the control systems of the ESP to activate more aggressively than if the driver had not counter-steered. In this way, the ESP would penalize with a more aggressive activation by the experienced driver for reacting properly.

BRIEF SUMMARY OF THE INVENTION

The present invention provides a system and method of regulating manual control to an experienced driver of a vehicle in a sliding condition, wherein the vehicle has an electronic stability program.

The present invention further provides a system and method of regulating a driver to manually steer a vehicle in a sliding condition to compensate or correct for the sliding condition before an electronic stability program of the vehicle activates a control system to correct for the sliding condition of the vehicle.

The present invention further provides a system and method of allowing a driver time to manually control a vehicle having an electronic stability program in a sliding condition before the electronic stability program activates a control system to correct the vehicle.

The present invention provides a system and method of adjusting an original ESP threshold of an electronic stability program for a vehicle when the vehicle is in a recoverable sliding condition.

The present invention provides a system and method of allowing manual control for a compensating driver of a vehicle during a sliding condition of the vehicle having an electronic stability program which uses a control system. The system and method allow a driver to manually control the vehicle within a time period before the electronic stability program re-determines whether the vehicle is manually controllable. The method includes recognizing the vehicle in a sliding condition and determining whether the vehicle is manually controllable in the sliding condition. The method further comprises adjusting the electronic stability program, if the vehicle is determined to be manually controllable. When the vehicle is determined to not be manually controllable, the method activates the control system to control the vehicle. Then, the electronic stability program applies a compensated brake pressure on one or more wheels or wheel ends based on the activation of the control system.

Further objects, features and advantages of the invention will become apparent from consideration of the following description and the appended claims when taken in connection with the accompanying drawings.

BRIEF DESCRIPTION OF THE DRAWINGS

FIG. 1 is a perspective view of a vehicle having an electronic stability program in accordance with the present invention;

FIG. 2 is a schematic diagram of the electronic stability program in accordance with the present invention;

FIG. 3 is a flow chart depicting one general method of regulating manual control of a vehicle in the sliding condition in accordance with the present invention; and FIG. 4 is a table depicting criteria for regulating manual control of the vehicle in FIG. 1 during a sliding condition of the vehicle.

DETAILED DESCRIPTION OF THE INVENTION

FIG. 1 illustrates a vehicle 10 having an electronic stability program (ESP) 11 which regulates manual control of the vehicle 10 for a compensating driver thereof during a sliding condition of the vehicle. In this embodiment, the electronic stability program 11 uses a stability control system (SCS), an anti-lock braking system (ABS), a traction control system (TCS), and an engine torque control system (ETC). The electronic stablity program 11 includes an electronic control unit (ECU) 12 which has a microprocessor for communicating with the systems mentioned above and the vehicle's electronic components within ESP 11. The ECU includes software and algorithms programmed therein to receive and transmit signals for operating the ESP 11.

ECU 12 is in electrical communication with steering wheel angle sensor 13, yaw rate sensor 16, lateral acceleration sensor 20, wheel speed sensors 23, hydraulic control unit 26, and pressure transducer 30. As shown, steering wheel angle sensor 13 is disposed adjacent steering wheel 31 of the vehicle for sensing a steering wheel angle. A steering wheel angle is an angle relative to a center position from which the steering wheel is rotated during operation of the vehicle. The steering wheel angle sensor may be any suitable steering wheel angle sensor for sensing steering wheel angles known in the art.

FIG. 2 illustrates a schematic diagram of ESP 11 having ECU 12 in communication with several vehicle electronic components described below. In this embodiment, sensors 13, 16, 20, 23 continually send data via sensor signals to ECU 12 by any suitable means, e.g., electrical current or frequency. Hydraulic control unit 26 and pressure transducer 30 are also in electrical communication with ECU 12. The pressure transducer senses brake pressure and sends a brake signal to the ECU. Hydraulic control unit 26 receives control signals from ECU 12 to apply brake pressure to the wheel ends of the vehicle.

As shown, ESP 11 includes yaw rate sensor 16 which is in electrical communication with ECU 12. Yaw is the rotation of a vehicle's body around its center point as viewed from above. Thus, yaw rate sensor senses the rotation of the vehicle under a time period. Yaw rate sensor 16 may be any suitable sensor capable of measuring yaw rate of the vehicle. Moreover, ESP 11 includes lateral acceleration sensor 20 which is in electrical communication with ECU 12. Lateral acceleration sensor measures lateral acceleration of the vehicle as known in the art. The lateral acceleration sensor 20 may be any suitable sensor capable of measuring lateral acceleration of the vehicle.

In this embodiment, the ESP 11 further includes wheel speed sensors 23, each of which is disposed adjacent a wheel end 33 of the vehicle. Wheel speed sensors 23 sense rotation and slippage of wheels as known in the art. Any suitable wheel speed sensor may be used for sensing wheel slippage and rotation. ESP 11 further includes hydraulic control unit 26 for applying pressure to the wheel ends of the vehicle and pressure transducer 30 for sensing pressure applied by the driver on the brake pedal of the vehicle.

As shown in FIGS. 3 and 4, method 110 is implemented for allowing manual control of the vehicle during a sliding condition of the vehicle. This allows a compensating driver to manually control the vehicle before the ESP may activate a control system, e.g., the SCS or ABS, to control the vehicle. To accomplish this, the ESP is adjusted to allow more time for the driver to manually control or compensate the vehicle and recover from the sliding condition of the vehicle. As shown in FIG. 4, a set of criteria is included in method 110 for allowing manual control for the compensating driver of the vehicle in the sliding condition. FIG. 4 is one example of criteria having measured, calculated, or fixed values implemented therein in an algorithm programmed within the ECU. As shown, the values may be represented by symbols and/or characters. For example, beta may represent vehicle side slip angle and beta_dot may represent rate of change of the vehicle side slip angle. Moreover, SWA may represent steering wheel angle and SWA_dot may represent rate of change of the steering wheel angle. Yaw error may represent a difference between measured yaw rate and an ideal yaw rate.

FIG. 3 depicts a method 110 of regulating manual control of the vehicle during a sliding condition thereof. Method 110 includes recognizing that the vehicle is in a sliding condition in box 113. ECU 12 recognizes or senses a rate of change of a vehicle side slip angle of the vehicle. This is accomplished by receiving sensor signals from yaw rate sensor 16 and lateral acceleration sensor 20 and wheel speed sensor 23 during normal operation of the vehicle. When data of the rate of change of the vehicle side slip angle is recognized by the ECU 12, the ECU 12 compares the rate of change of the vehicle side slip angle to a minimum rate of change of the side slip angle configured therein. The minimum rate of change of side slip angle may range between about 2° and 8°.

The ECU 12 further recognizes or senses a vehicle yaw rate of the vehicle. This may be accomplished by receiving sensor signals from yaw rate sensor 16 during normal operation of the vehicle. The ECU further compares the vehicle yaw rate to a reference or model yaw rate calculated or configured therein, where the difference in those values is the yaw error. In this embodiment, the minimum yaw rate error may be between about 5° and 15° per second. The ECU then determines whether the vehicle side slip angle is greater than the minimum slide slip angle and whether the vehicle yaw rate error is greater than the minimum yaw rate. If so, then the ECU 12 determines that the vehicle is in the sliding condition.

As shown in FIG. 3, method 110 further includes determining whether the vehicle is manually controllable in the sliding condition in box 116. The ECU 12 accomplishes this by performing a plurality of determinations. The ECU 12 determines whether the vehicle is within a controllable range and determines whether the vehicle is being steered toward a path on which the vehicle is sliding. The ECU further determines whether the vehicle is being steered within a rate at which the vehicle is sliding and determines whether a rate of rotation of the vehicle in the sliding condition is within a predetermined range.

The ECU 12 determines whether the vehicle is within a controllable range. In this embodiment, the ECU 12 compares the vehicle side slip angle to a maximum side slip angle. The maximum rate of change of the side slip angle may be between about 10°–20°. The ECU then compares the vehicle yaw error rate to a maximum yaw rate error. In this embodiment, the maximum yaw rate error is between about 35°–45° per second. If the rate of change of the vehicle side slip angle is less than the maximum rate of change of the side slip angle and if the vehicle yaw rate error is less than the maximum yaw rate error, then the ECU 12 concludes or recognizes that the vehicle 10 is within the controllable range.

Then, the ECU determines whether the vehicle is being steered toward a path on which the vehicle is sliding. The ECU essentially checks or determines whether the driver is steering into or away from a skid or slide. In a situation where the ECU determines that the driver is steering the vehicle into the skid, the ECU will activate the stability control system to control or take over control of the vehicle as described in greater detail below. In determining whether the vehicle is being steered toward or away from a path on which the vehicle is sliding, the ECU recognizes or senses a steering wheel angle of the vehicle. This may be accomplished by receiving sensor signals from the steering wheel angle sensor during the sliding condition of the vehicle.

The ECU then determines a rate of change of the steering wheel angle and estimates a rate of change of the vehicle side slip angle. Then, the ECU compares the rate of change of the steering wheel angle to the rate of change of the vehicle side slip angle. If the signs of the rate of change of the steering wheel angle is about the same as the signs of the rate of change of the vehicle side slip angle, then the ECU recognizes or determines that the vehicle is being steered away from the path on which the vehicle is sliding. In this situation, the ECU continues to allow the driver to manually control or steer the vehicle. However, if the ECU determines that the vehicle is being steered toward the path on which the vehicle is sliding, then the ECU will activate its stability control system and anti-lock brake system to take over or control the vehicle in box 123.

The ECU determines whether the vehicle is being steered within a rate at which the vehicle is sliding. To accomplish this, the ECU determines the rate of change of the vehicle side slip angle and the rate of change of the steering wheel angle as mentioned above. The ECU also calculates a tire steer angle (TSA) by numerically dividing the steering wheel angle by a steering wheel gain factor. The ECU then compares the rate of change of the TSA to the rate of change of the vehicle side slip angle plus/minus a predetermined active band angle. In this embodiment, the predetermined active band angle is about 2°–5° per second.

If the rate of change of the steering wheel angle falls within a range based on the vehicle side slip angle plus/minus the predetermined active band angle, then the ECU recognizes that the vehicle is being steered within the rate at which the vehicle is sliding. In this embodiment, if the absolute value of the rate of change of the steering wheel angle is greater than the rate of change of the vehicle side slip angle minus the predetermined active band angle, and if the absolute value of the rate of change of the steering wheel angle is less than the rate of change of the vehicle side slip angle plus the predetermined active band angle, then the vehicle is recognized by the ECU as being steered within the rate of change at which the vehicle is sliding. This defines a range within which the vehicle may be manually steered. However, if the ECU determines that the vehicle is not being steered within the rate of change at which the vehicle is sliding, then the ECU activates the stability control system and the anti-lock brake system to control the vehicle in box 123.

The ECU determines whether a driver reaction represented by a rate of rotation of the vehicle in the sliding condition is within a predetermined range. To accomplish this, the ECU compares the vehicle steering wheel angle with a maximum steering wheel angle. The maximum steering wheel angle may be about 90°–180°, preferably between 110° and 150°. The ECU then compares the vehicle steering wheel angle with a minimum steering wheel angle. In this embodiment, the minimum steering wheel angle is between about 45°–60°. The ECU determines whether the vehicle steering wheel angle is less than the maximum steering wheel angle and whether the vehicle steering wheel angle is greater than the minimum steering wheel angle. This defines the driver reaction represented by the rate of rotation range of the vehicle being manually controlled. If the vehicle steering wheel angle falls within the rate of rotation range, then the ECU concludes or recognizes that the rate of rotation of the vehicle in the sliding condition is within the predetermined range.

In a situation wherein the ECU determines that the vehicle is manually controllable in the sliding condition, the ECU adjusts the electronic stability program in box 120 described below. The ECU is configured to have an original ESP threshold of the electronic stability program. The original ESP threshold represents a maximum value of the yaw error during a sliding condition of the vehicle. The yaw error is an actual rate of change of rotation of the vehicle (in degrees per time) minus a predetermined reference value or an ideal yaw error. In this embodiment, if the yaw error is greater than the original ESP threshold, then the ESP takes over and controls the vehicle.

However, when it is determined that the vehicle is manually controllable, the ESP adjusts the original ESP threshold to define a new ESP threshold. This allows a higher rate of change of rotation of the vehicle and a greater range of steering for the driver during the sliding condition of the vehicle. As a result, the ESP allows the driver more time to manually recover or control the vehicle in the sliding condition.

The step of adjusting the electronic stability program in box 120 may also include increasing the predetermined active band angle to increase the steering wheel angle range within which the vehicle may be manually steered. Additionally, the maximum steering wheel angle may be increased and the minimum steering wheel angle may be decreased to allow an increased rate of rotation range of the vehicle being manually controlled. Moreover, the ESP may delay the step of determining whether the vehicle is manually controllable in the sliding condition for a time period, for example, 50–100 milliseconds. The original ESP threshold is between about 4°–6°. In this embodiment, the new ESP threshold is between about 10°–20°.

The ESP further activates the stability control system and the anti-lock brake system to control the vehicle when the vehicle is not manually controllable in box 123. The ESP calculates a yaw error based on the vehicle's actual rate of rotation minus a model yaw rate. The ESP compares the yaw error to the new ESP threshold. Then, the ESP determines the compensated brake pressure to be applied on the vehicle wherein the compensated brake pressure is based on the comparison of the yaw error and the new ESP threshold. To determine the compensated brake pressure, the ESP determines whether the yaw error is greater than the new ESP threshold. If so, then the ESP finds a difference between the yaw error and the new ESP threshold. The difference is multiplied with a compensating proportional gain, wherein the compensated proportional gain is based on time and yaw error. In this embodiment, the model yaw rate is between about 5°–45° per second.

The compensated brake pressure is based on the compensated proportional gain to allow the ESP to generate an additional brake pressure. The additional brake pressure allows the vehicle to "make up" or "catch up" on braking and steering which would otherwise been applied had the ESP forgone the adjustment in box 120.

While the present invention has been described in terms of preferred embodiments, it will be understood, of course, that the invention is not limited thereto since modifications may be made to those skilled in the art, particularly in light of the foregoing teachings.

What is claimed is:

1. A method of allowing manual control for a driver of a vehicle during a sliding condition of the vehicle having an electronic stability program using a control system, the method comprising:

recognizing the vehicle in a sliding condition;

determining whether the vehicle is manually controllable in the sliding condition;

adjusting the electronic stability program and preventing operation of the control system, if the vehicle is determined to be manually controllable; and activating the control system to control the vehicle, when the vehicle is not manually controllable; by applying a compensated brake pressure based on the activation of the control system.

2. The method of claim 1 wherein recognizing the vehicle in the sliding condition includes:

sensing a rate of change of a vehicle side slip angle of the vehicle;

comparing the rate of change of the vehicle side slip angle to a minimum rate of change of the side slip angle;

sensing a vehicle yaw rate of the vehicle;

determining a yaw rate error based on the vehicle yaw rate;

comparing the yaw rate error to a minimum yaw rate error; and determining that the vehicle is in the sliding condition, if the rate of change of the vehicle side slip angle is greater than a minimum side slip angle and the vehicle yaw rate is greater than a minimum yaw rate.

3. The method of claim 1 wherein determining whether the vehicle is manually controllable includes:
   determining whether the vehicle is within a controllable range;
   determining whether the vehicle is being steered toward a path on which the vehicle is sliding;
   determining whether the vehicle is being steered at about a rate which the vehicle is sliding;
   determining whether a rate of rotation of the vehicle in the sliding condition is within a predetermined range; and
   recognizing that the vehicle is manually controllable, if the vehicle is within the controllable range, if the vehicle is being steered toward the path on which the vehicle is sliding, if the vehicle is being steered within the rate at which the vehicle is sliding, and if the rate of rotation of the vehicle in the sliding condition is within the predetermined range.

4. The method of claim 3 wherein determining whether the vehicle is within the controllable range, the controllable range includes sensing a rate of change of the vehicle side slip angle of the vehicle;
   comparing the rate of change of the vehicle side slip angle to a maximum side slip angle;
   sensing a vehicle yaw rate of the vehicle;
   determining a yaw rate error based on the vehicle yaw rate;
   comparing the yaw rate error to a maximum yaw rate error of the vehicle; and
   recognizing that the vehicle is within the controllable range, if the rate of change of the vehicle side slip angle is less than a maximum rate of change of the side slip angle and the vehicle yaw rate error is less than the maximum yaw rate error.

5. The method of claim 3 wherein determining whether the vehicle is being steered toward the path on which the vehicle is sliding includes sensing a steering wheel angle of the vehicle;
   determining a rate of change of the steering wheel angle;
   sensing a vehicle side slip angle;
   determining a rate of change of the vehicle side slip angle;
   comparing the rate of change of the steering wheel angle to the rate of change of the vehicle side slip angle; and
   recognizing that the vehicle is being steered toward the path on which the vehicle is sliding, if the rate of change of the steering wheel angle is about the same as the rate of change of the vehicle side slip angle.

6. The method of claim 3 wherein determining whether the vehicle is being steered at the rate at which the vehicle is sliding includes:
   sensing a vehicle side slip angle of the vehicle;
   determining a rate of change of the vehicle side slip angle;
   sensing a vehicle steering wheel angle of the vehicle;
   determining a rate of change of the steering wheel angle;
   comparing the rate of change of the steering wheel angle to the rate of change of the vehicle side slip angle and a predetermined active band angle;
   recognizing that the vehicle is being steered within the rate at which the vehicle is sliding, if:
      the rate of change of the steering wheel angle is greater than the rate of change of the vehicle side slip angle minus the predetermined active band angle; and
      the rate of change of the steering wheel is less than the rate of change of the vehicle side slip angle plus the predetermined active band angle, defining a rate of change of the steering wheel angle range within which the vehicle is manually steered.

7. The method of claim 3 wherein determining whether the rate of rotation of the vehicle in the sliding condition is within the predetermined range includes:
   sensing a vehicle steering wheel angle of the vehicle;
   comparing the vehicle steering wheel angle with a maximum steering wheel angle;
   comparing the vehicle steering wheel angle with a minimum steering wheel angle; and
   recognizing that the rate of rotation of the vehicle in the sliding condition is within the predetermined range, if:
      the vehicle steering wheel angle is less than the maximum steering wheel angle; and
      the vehicle steering wheel angle is greater than the minimum steering wheel angle, defining a rate of rotation range of the vehicle being manually controlled.

8. The method of claim 1 wherein adjusting the electronic stability program includes:
   providing an original ESP threshold of the electronic stability program; and
   adjusting the original ESP threshold to define a new ESP threshold.

9. The method of claim 6 wherein adjusting the electronic stability program includes increasing the predetermined active band angle to increase a steering wheel angle range within which the vehicle is manually controlled.

10. The method of claim 7 wherein adjusting the electronic stability program includes increasing the maximum steering wheel angle and decreasing the minimum steering wheel angle to allow an increased rate of rotation range of the vehicle being manually controlled.

11. The method of claim 1 wherein adjusting the electronic stability program includes delaying the step of determining whether the vehicle is manually controllable in the sliding condition for a time period.

12. The method of claim 11 wherein the time period is between about 50–100 milliseconds.

13. The method of claim 8 wherein activating the stability control system to control the vehicle includes:
   sensing a vehicle yaw rate of the vehicle;
   calculating a yaw error based on the vehicle yaw rate and a model yaw rate;
   comparing the yaw error to the new ESP threshold; and
   determining the compensated brake pressure to be applied on the vehicle, the compensated brake pressure being based on the comparison of the yaw error and the new ESP threshold.

14. The method of claim 13 wherein determining the compensated brake pressure includes:
   determining whether the yaw error is greater than the new ESP threshold;
   finding a difference between the yaw error and the new ESP threshold, if the yaw error is greater than the new ESP threshold; and
   multiplying the difference with a compensating proportional gain, the compensating proportional gain being based on time and yaw error.

15. The method of claim 2 wherein the minimum rate of change of the side slip angle is about 2°–8°.

16. The method of claim 2 wherein the minimum yaw rate error is between about 5° to 15° per second.

17. The method of claim 4 wherein the maximum rate of change of the side slip angle is about 10° to 20°.

18. The method of claim 4 wherein the maximum yaw rate error is about 35° to 45° per second.

19. The method of claim 6 wherein the predetermined active band is about 2° to 5° per second.

20. The method of claim 7 wherein the maximum steering wheel angle is about 90° to 180°.

21. The method of claim 7 wherein the minimum steering wheel angle is about 45° to 60°.

22. The method of claim 8 wherein the original ESP threshold is about 4° to 6°.

23. The method of claim 8 wherein the new ESP threshold is about between 10° to 20°.

24. The method of claim 13 wherein the model yaw rate is about 5° to 45° per second.

25. A method of regulating manual control for a compensating driver of a vehicle during a sliding condition of the vehicle having an electronic stability program using a stability control system, the method comprising:

recognizing the vehicle in a sliding condition;

determining whether the vehicle is manually controllable in the sliding condition;

adjusting an original ESP threshold to define a new ESP threshold configured within the electronic stability program, if the vehicle is determined to be manually controllable, calculating a yaw error based on a vehicle yaw rate minus a model yaw rate, when the vehicle is not manually controllable;

comparing the yaw error to the new ESP threshold;

determining a compensated brake pressure to be applied on the vehicle, the compensated brake pressure being based on the comparison of the yaw error and the new ESP threshold; and applying the compensated brake pressure on the vehicle.

26. The method of claim 25 wherein recognizing the vehicle in the sliding condition includes:

sensing a vehicle side slip angle of the vehicle;

determining a rate of change of the vehicle side slip angle;

comparing the rate of change of the side slip angle to a minimum rate of change of the side slip angle;

sensing a vehicle yaw rate of the vehicle;

comparing the vehicle yaw rate to a minimum yaw rate; and determining that the vehicle is in the sliding condition, if the rate of change of the vehicle side slip angle is greater than the minimum rate of change of the side slip angle and the yaw rate error is greater than the minimum yaw rate error.

27. The method of claim 25 wherein determining whether the vehicle is manually controllable includes:

determining whether the vehicle is within a controllable range;

determining whether the vehicle is being steered toward a path on which the vehicle is sliding;

determining whether the vehicle is being steered at a rate which the vehicle is sliding;

determining whether a rate of rotation of the vehicle in the sliding condition is within a predetermined range; and recognizing that the vehicle is manually controllable, if the vehicle is within the controllable range, if the vehicle is being steered toward the path on which the vehicle is sliding, if the vehicle is being steered within the rate at which the vehicle is sliding, and if the rate of rotation of the vehicle in the sliding condition is within the predetermined range.

28. The method of claim 27 wherein determining whether the vehicle is within the controllable range, the controllable range includes:

sensing a rate of change of a vehicle side slip angle of the vehicle;

comparing the rate of change of the vehicle side slip angle to a maximum rate of change of the side slip angle;

sensing a vehicle yaw rate of the vehicle;

determining a yaw rate error based on the vehicle yaw rate;

comparing the vehicle yaw rate error to a maximum yaw rate error of the vehicle; and recognizing that the vehicle is within the controllable range, if the rate of change of the vehicle side slip angle is less than a maximum rate of change of the side slip angle and the vehicle yaw rate error is less than the maximum yaw rate error.

29. The method of claim 27 wherein determining whether the vehicle is being steered toward the path on which the vehicle is sliding includes sensing a steering wheel angle of the vehicle;

determining a rate of change of the steering wheel angle;

sensing a vehicle side slip angle;

determining a rate of change of the vehicle side slip angle;

comparing the rate of change of the steering wheel angle to the rate of change of the vehicle side slip angle; and recognizing that the vehicle is being steered toward the path on which the vehicle is sliding, if the rate of change of the steering wheel angle is about the same as the rate of change of the vehicle side slip angle.

30. The method of claim 27 wherein determining whether the vehicle is being steered at the rate at which the vehicle is sliding includes:

sensing a vehicle side slip angle of the vehicle;

determining a rate of change of the vehicle side slip angle;

sensing a vehicle steering wheel angle of the vehicle;

determining a rate of change of the steering wheel angle;

comparing the rate of change of the steering wheel angle to the rate of change of the vehicle side slip angle and a predetermined active band angle; and recognizing that the vehicle is being steered within the rate at which the vehicle is sliding, if:

the rate of change of the steering wheel angle is greater than the rate of change of the vehicle side slip angle minus the predetermined active band angle; and the rate of change of the steering wheel is less than the rate of change of the vehicle side slip angle plus the predetermined active band angle, defining a steering wheel angle range within which the vehicle is manually steered.

31. The method of claim 27 wherein determining whether the rate of rotation of the vehicle in the sliding condition is within the predetermined range includes:

sensing a vehicle steering wheel angle of the vehicle;

comparing the vehicle steering wheel angle with a maximum steering wheel angle;

comparing the vehicle steering wheel angle with a minimum steering wheel angle; and recognizing that the rate of rotation of the vehicle in the sliding condition is within the predetermined range, if:

the vehicle steering wheel angle is less than the maximum steering wheel angle; and the vehicle steering wheel angle is greater than the minimum steering wheel angle, defining a rate of rotation range of the vehicle being manually controlled.

32. The method of claim 30 wherein adjusting the electronic stability program includes increasing the predetermined active band angle to increase a steering wheel angle range within which the vehicle is manually controlled.

33. The method of claim 31 wherein adjusting the electronic stability program includes increasing the maximum steering wheel angle and decreasing the minimum steering wheel angle to allow an increased rate of rotation range of the vehicle being manually controlled.

34. The method of claim 25 wherein adjusting the electronic stability program includes delaying the step of determining whether the vehicle is manually controllable in the sliding condition for a time period.

35. The method of claim 34 wherein the time period is about 50–100 milliseconds.

36. The method of claim 25 wherein determining the compensated brake pressure includes:

determining whether the yaw error is greater than the new ESP threshold;

finding a difference between the yaw error and the new ESP threshold, if the yaw error is greater than the new ESP threshold; and multiplying the difference with a compensating proportional gain, the compensating proportional gain being based on time and yaw error.

37. The method of claim 26 wherein the minimum rate of change of the side slip angle is about 2° to 8°.

38. The method of claim 28 wherein the minimum yaw rate error is about 5° to 15° per second.

39. The method of claim 28 wherein the maximum rate of change of the side slip angle is about 10° to 20°.

40. The method of claim 28 wherein the maximum yaw rate error is about 35° to 45° per second.

41. The method of claim 30 wherein the predetermined active band is about 2° to 5° per second.

42. The method of claim 31 wherein the maximum steering wheel angle is about 90° to 180°.

43. The method of claim 31 wherein the minimum steering wheel angle is about 45° to 60°.

44. The method of claim 25 wherein the original ESP threshold is about 4° to 6°.

45. The method of claim 32 wherein the new ESP threshold is about between 10° to 20°.

46. A method of allowing manual control for a compensating driver of a vehicle during a sliding condition of the vehicle having an electronic stability program using a stability control system, the method comprising:

recognizing the vehicle in a sliding condition;

determining whether the vehicle is within a controllable range;

determining whether the vehicle is being steered toward a path on which the vehicle is sliding;

determining whether the vehicle is being steered at a rate which the vehicle is sliding;

determining whether a rate of rotation of the vehicle in the sliding condition is within a predetermined range;

recognizing that the vehicle is manually controllable, if:
the vehicle is within the controllable range, the vehicle is being steered toward the path on which the vehicle is sliding, the vehicle is being steered within the rate at which the vehicle is sliding, and the rate of rotation of the vehicle in the sliding condition is within the predetermined range;

adjusting the electronic stability program, if the vehicle is determined to be manually controllable;

activating the stability control system to control the vehicle, when the vehicle is not manually controllable; and applying a compensated brake pressure based on the activation of the stability control system.

47. An electronic stability program system of the type having a stability control system, for allowing manual control of a vehicle during a sliding condition of the vehicle, the system comprising:

a mechanism for recognizing the vehicle in a sliding condition;

a mechanism for determining whether the vehicle is manually controllable in the sliding condition;

a mechanism for adjusting the electronic stability program and preventing the operation of the stability control system, if the vehicle is determined to be manually controllable;

a mechanism for activating the stability control system to control the vehicle, when the vehicle is not manually controllable; and a mechanism for applying a compensated brake pressure based on the activation of the stability control system.

* * * * *